W. L. KLASERNER.
FORCE FEED OIL AND GREASE DISTRIBUTOR.
APPLICATION FILED MAR. 28, 1921.
1,428,547.
Patented Sept. 12, 1922.
2 SHEETS—SHEET 1.
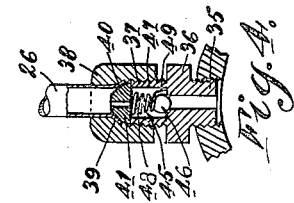
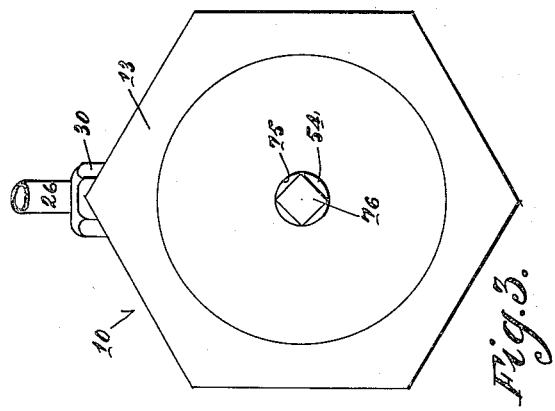
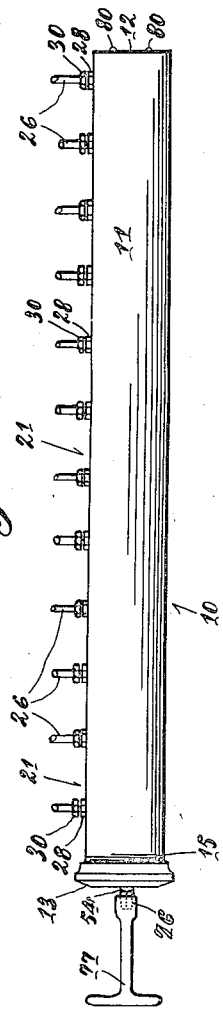
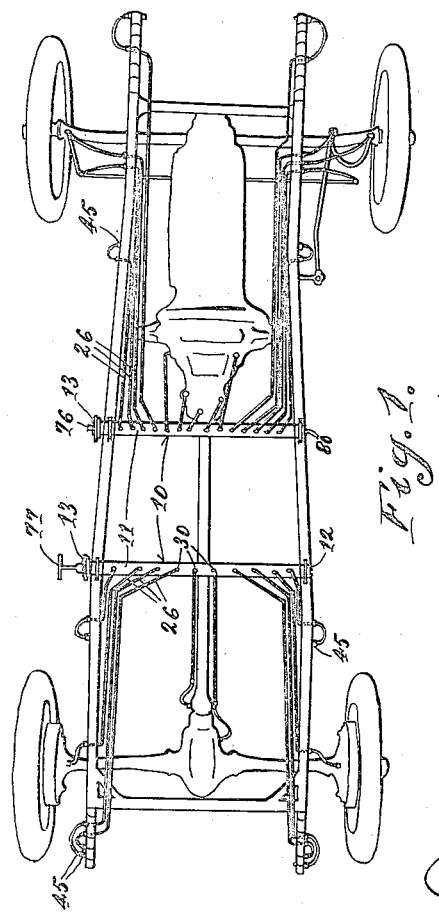
Inventor:
W. Lee Klaserner
By James N. Ramsey
Attorney.

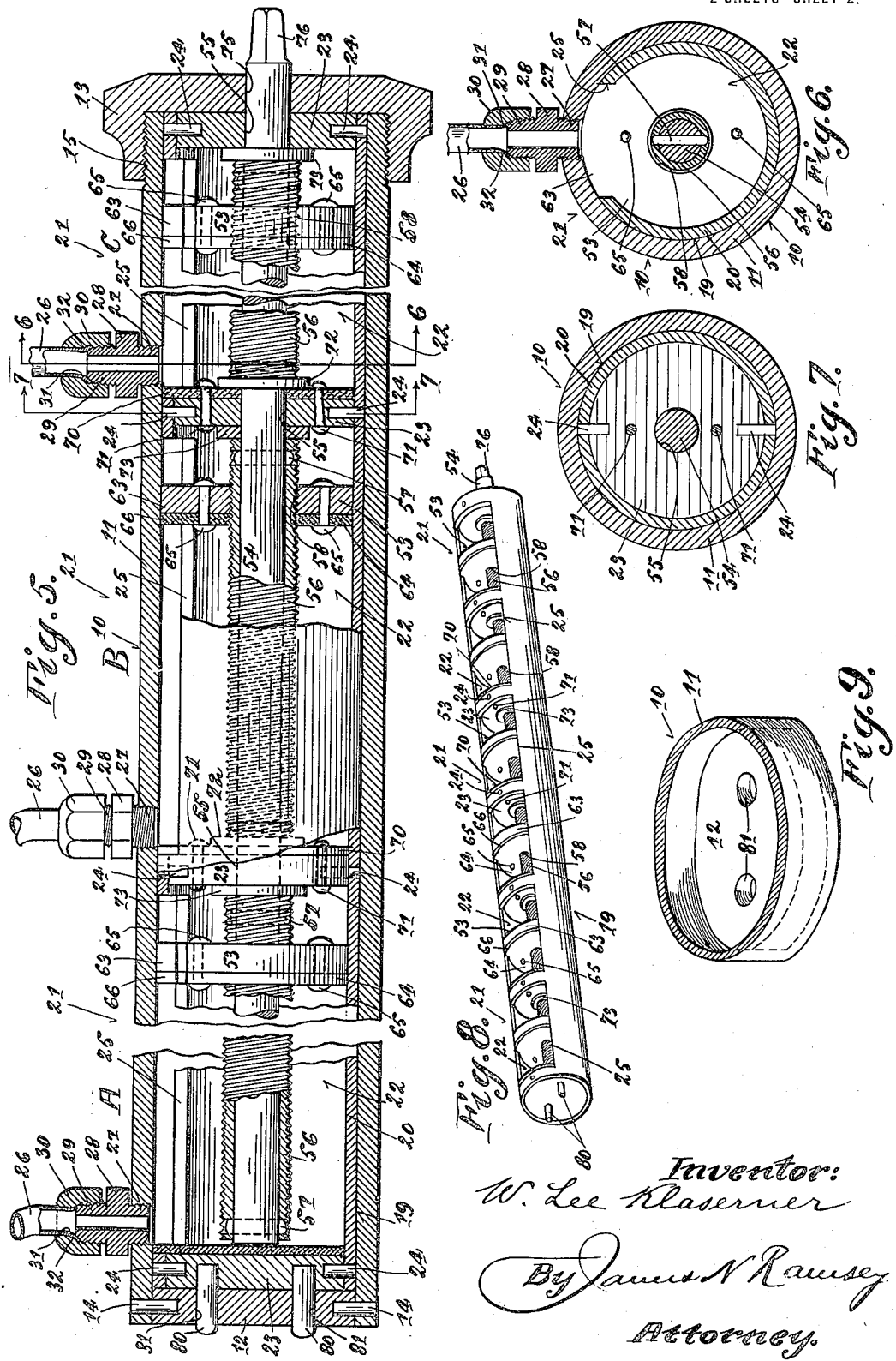

Patented Sept. 12, 1922.

1,428,547

UNITED STATES PATENT OFFICE.

WILLIAM LEE KLASERNER, OF LUDLOW, KENTUCKY.

FORCE-FEED OIL AND GREASE DISTRIBUTOR.

Application filed March 28, 1921. Serial No. 456,317.

*To all whom it may concern:*

Be it known that I, WILLIAM LEE KLASERNER, a citizen of the United States, residing near Ludlow, in the county of Kenton and State of Kentucky, have invented certain new and useful Improvements in Force-Feed Oil and Grease Distributors, of which the following is a specification.

My invention relates more particularly to means for distribution of oil and grease in the chassis of an automobile and the same may also be applied to tractors and other machines.

It has heretofore been the practice to lubricate the various parts of a vehicle or machine with grease cups or oil reservoirs of varying capacities for containing lubricant, and designed to be filled at various periods of time. For instance, some of the grease cups are filled each day and others every week and then again others every month. This requires constant attention on the part of the person taking care of the vehicle. A great deal of confusion is occasioned owing to the different times at which lubricant cups are filled. Therefore, some of them may be overlooked, for instance, in the case of an automobile, the clutch thrust collar requires attention daily, whereas the universal joints require attention only once a month. When lubricant is not regularly supplied, the parts are subject to rapid wear. The various grease and oil cups are placed about the machine in various locations, some of them very inaccessible, requiring extra effort and special devices, such as grease guns, to fill the same. Different parts require different qualities and amounts of lubricant, for instance, the differential gearing requires a very heavy quality of oil, the clutch requires a very thin oil, and the steering knuckle and connections require an extremely heavy grease.

The object of my invention is to lubricate a plurality of bearings at a single operation; to simultaneously lubricate the different parts of the machine with different kinds of lubricant, depending upon the character or kind of lubricant required for each part; to provide a simple means whereby the lubricant is easily and conveniently encased within the distributor and whereby a large amount of lubricant may be carried ready for use, thus greatly minimizing the attention necessary in providing for the lubrication of a machine.

Another object of the invention is to insure the lubrication of all parts to be lubricated.

Another object of the invention is to provide means whereby the different parts of the machine requiring different amounts of lubricant, can be supplied as needed for a given period of time by a single charging of the distributor.

Another object of this invention is to provide a means whereby the functions of supplying lubricant to the bearings and filling of containers is centralized and made readily accessible.

My invention consists in the provision of a central lubricant distributor comprising an outer casing adapted to hold a removable and integrally formed series of separate and distinct force feed lubricating units, in which the lubricant is contained, and conducted to the various parts by tubular connections.

My invention further consists in the means by which the lubricant in the separate units is simultaneously forced to the parts to be lubricated.

My invention further consists in the parts and combination and arrangement thereof as herein described and claimed.

In the drawings:

Fig. 1 is a perspective view of my improved device as applied to the chassis of an automobile showing two of my improved disrtibutors mounted thereon.

Fig. 2 is a side elevation of my improved device.

Fig. 3 is an end elevation of the same.

Fig. 4 is a vertical longitudinal section of the check valve.

Fig. 5 is a vertical longitudinal section of my improved device partly broken away.

Fig. 6 is a vertical cross section of the same, taken in a plane corresponding to the line 6—6 of Fig. 5.

Fig. 7 is a similar view taken in a plane corresponding to the line 7—7 of Fig. 5.

Fig. 8 is a perspective view of the lubricant container removed from the casing.

Fig. 9 is a perspective view of the lower part of the casing, the upper part being broken away.

I have illustrated my improved device, as applied to the chassis of an automobile, and it will be hereinafter referred to in this connection. My device is applicable, however, to any machine or mechanism having parts to be lubricated. A casing 10 comprises a cylindrical wall 11, a fixed end wall 12 and a removable end wall 13. The fixed end wall is secured to the cylindrical wall as by pins 14. The end wall 13 is made readily removable, as by having threaded connection 15 with the casing.

A removable lubricant container 19 is adapted to be received within the casing, and comprises a cylinder 20 having lubricating units 21 therein. The outside surface of the cylinder closely conforms to the inner surface of the casing.

Chambers 22 are formed within the cylinder as by having partitions 23 placed at regular intervals therein, and securely held by pins 24. The chambers are adapted to be filled with lubricant through openings 25 formed by cutting away the portions of the cylinder between the partitions. The openings are of such size as to readily permit the filling of the chambers, without employing grease guns for heavy greases or spouts for the oils.

Tubular connections 26 serve to convey the lubricant from the lubricating units to the bearings. Each of the tubular connections has communication with one of the chambers, as by having the inner end 27 of a nipple 28 threaded into the casing at a point closely adjacent one end of the opening 25 in the lubricant container. The outer end 29 thereof has threaded engagement with a clamp nut 30, the annular sloping shoulder 31 of which clamps a flared end 32 of the tube against the outer end of the nipple, thus forming an oil-tight joint. The other end of the tube is connected to its respective bearing, as by having the outer end 35 of a nipple 36 threaded into the wall thereof, and the inner end 37 having threaded engagement with a clamp nut 38, the annular sloping shoulder 39 of which clamps the flared end 40 of the tube against a valve seat 41. The valve seat is at the same time clamped against the outer end of the nipple by the clamp nut 38.

Means are provided to prevent the lubricant from draining out of the lubricating units by gravity. Thus 45 is a check valve of which the valve seat 41 is a part. A ball 46 in a counter bore 47 coacts with the valve seat, and is urged thereagainst by frusto-conical spring 48 received in the counter bore and resting on the annular shoulder 49.

For forcing the lubricant to the bearings, a piston 53 is located in each of the chambers and has endwise movement therein. An operating shaft 54 is journalled in bearings 55 in the partitions and has threaded sleeves 56 secured thereto by pins 57, in each of the chambers. The sleeves coact with threaded bearings 58 in the pistons thereby imparting endwise movement thereto, when the shaft is rotated, thus acting as a force pump to expel the lubricant from the chambers and force it through the tubes to the bearings. Projections 63 are formed on the pistons of such size as to conform closely to the cross sectional area of the openings 25. In this manner, the lubricant is prevented from leaking past the piston and enter the space behind the same. Washers 64 of flexible material such as leather or felt, of slightly larger diameter than the pistons are secured to the sides thereof adjacent the tubes, by rivets 65 and have projections 66 thereon of slightly larger cross sectional area than the cross sectional area of the openings 25. In this manner, leakage of lubricant past the pistons is effectively guarded against.

Leather washers 70 of slightly larger diameter than the partitions 23, are secured thereto by rivets 71 on the side facing the leather washers on the pistons. The leather washers act as packings to prevent the leakage of lubricant past the partitions when the pistons exert pressure thereon. Washers 72 or harder material than leather are received about the shaft 54, and between one end of the sleeves and the leather washers 70. Similarly, washers 73 are received between the ends of the sleeves and the partitions.

The operating shaft extends beyond the outermost partition and through a hole 75 in the removable end wall 13. A polygonal end 76 is formed on the shaft adapted to coact with a T wrench 77 for manually imparting rotation thereto.

In order to locate the openings 25 so as to face the tubular connections secured in the casing when the lubricant container is replaced, pins 80 are secured therein, adapted to coact with apertures 81 in the fixed end wall 12 of the casing. The apertures also act to release the air in the casing when the container is inserted and also act to hold same stationary when the operating shaft is rotated.

The distributor is mounted so as to readily permit the removal of the container, for instance, under the floor of the vehicle having its removable end wall and the polygonal end of the operating shaft readily accessible. When it is desired to charge the distributor, the end wall 13 is unscrewed from the casing. The container is then removed from the casing. The operating shaft is then rotated so as to move the pistons to the opposite end of the chambers. The chambers are then filled with the proper quantity and kind of lubricant required for the particular bearings they serve. For example, the unit indicated generally at "A" may be connected with the differential which requires an extremely heavy oil, and similarly, the chambers "B" may be connected with the clutch which requires a very light oil, and the chamber "C" connected with the universal joint which requires a very heavy grease. It is only necessary to apply lubricant to the differential housing once every three months, the clutch needs to be oiled only once in two months, and the universal joint only once in five months. Therefor, such a quantity of lubricant is placed in each chamber, as will correspond to the particular requirements of the bearings or parts they lubricate, over a given period of time.

After the compartments have been filled, the container is placed within the casing, the pins 80 entering the apertures 81, thus locating the opening 25 in the proper position in relation to the tubular connections. The removable end wall is then screwed back into place. The operating shaft is then given a number of turns with the T wrench, thereby imparting movement to the pistons, which in turn, force the lubricant to the bearings. At stated intervals, the caretaker of the car gives the operating shaft a number of turns, thus insuring constant lubrication of the various parts of the vehicle. In this manner, attention to the lubrication of the parts of the vehicle is taken care of at stated periods, and by a single operation.

What I claim as new and useful and desire to secure by Letters Patent, is:

1. In a force feed oil and grease distributor, a casing, parts, tubular connection between said casing and said parts, and a removable integrally formed plurality of simultaneously actuated lubricating self-contained units contained in said casing whereby said parts are lubricated through said tubular connections.

2. In a force feed oil and grease distributor, a casing, a plurality of removable self-contained lubricating units, parts, tubular connections between said parts and said lubricating units, and means whereby said units are actuated simultaneously for lubricating said bearings through said tubular connections.

3. In a force feed lubricant distributor, a casing, a removable lubricant container received within said casing, a plurality of self-contained lubricant chambers in said container adapted to contain grease, parts to be lubricated, tubular connections between said parts and said lubricant chambers, and means to combinedly force grease from said chambers to said parts to be lubricated through said tubular connections.

4. In a force feed oil and grease distributor, a casing, a removable lubricant container received within said casing and comprising, a plurality of integrally formed chambers adapted to contain lubricants, pistons in said chambers, a screw having threaded connection with each of said pistons, whereby said pistons are simultaneously actuated, and said chambers having openings therein, parts, tubular connections between said chambers and said parts whereby the lubricant is forced thereto through said openings and said tubular connections by the action of said pistons.

5. In a force feed oil and grease distributor, a plurality of integrally connected and simultaneously actuated lubricating units, each supplied with lubricant independently of the other units, parts to be lubricated, tubular connections between each of said units and said parts, and a check valve between said parts to be lubricated and said tubular connections, adapted to prevent the draining of lubricant from said units when said units are not actuated.

6. In a force feed oil and grease distributor, a removable integrally formed plurality of simultaneously actuated lubricating units consisting of a cylinder, partitions in said cylinder forming chambers adapted to contain lubricant, said chambers having openings therein formed by removing parts of said cylinder, pistons endwise movable in said chambers, projections on said pistons the outer surfaces of which are a continuation of the outside surface of said cylinder adapted to cross sectionally close said openings and have endwise movement therein, an operating shaft passing through all of said chambers, bearings in said partitions for said operating shaft, threaded sleeves secured to said shaft in each of said chambers and having threaded connections with said pistons, and a polygonal end on said shaft whereby said shaft and pistons are actuated.

7. In a force feed oil and grease distributor, a casing comprising, a cylinder, a fixed end wall, and a removable end wall, parts, tubular connections between said cylinder and said parts, check valves between said tubular connections and said parts, and a removable integrally formed plurality of simultaneously actuated force feed lubricating units held within said casing by said removable end wall and consisting of a cylinder, partitions in said cylinder forming lubricant chambers, said chambers having openings therein formed by removing parts of said cylinder, pistons endwise movable in said chambers, projections on said pistons the outer surfaces of which are a continuation of the outside surface of said second named cylinder adapted to cross sectionally close said openings and have endwise movement therein, an operating shaft passing through said chambers and through said removable end wall, a polygonal end on said shaft, bearings in said partitions for said shaft, and threaded sleeves secured to said shaft in each of said chambers and having threaded connections with said pistons whereby endwise movement is parted thereto for forcing lubricant through said tubular connections to said parts when said shaft is rotated, pins on said integrally formed units, and apertures in said fixed end wall adapted to coact with said pins, whereby said openings are located so as to form communication between said chambers and said tubular connections and said second named cylinder is held against rotary movement.

8. In a force feed oil and grease distributor, a casing, parts to be lubricated, tubular connections between said casing and said parts to be lubricated, and a plurality of lubricating units each adapted to receive a different kind or quality of lubricant independently of the other units whereby said parts are lubricated as required through said tubular connections.

9. In a force feed oil and grease distributor, a casing, parts to be lubricated, tubular connections between said casing and said parts to be lubricated, and a plurality of removable self-contained lubricating units each adapted to be supplied with lubricant separately and independently of the casing and of the other units, whereby after inserting the lubricating units in the casing the lubricant of the respective units may be discharged in varying quantities and at varying periods, as desired, by a single operation.

10. In a force feed oil and grease distributor, an outer casing, parts to be lubricated, tubular connections between said outer casing and said parts to be lubricated, and a central lubricant distributor comprising said outer casing adapted to hold a removable and integrally formed series of separate and distinct self-contained force feed lubricating units in which the lubricant is contained and connected to the several parts to be lubricated by the respective tubular connections, and said units, substantially as set forth.

11. In a force feed oil and grease distributor, a casing, parts to be lubricated, tubular connections between said casing and said parts to be lubricated, and a plurality of removable self contained lubricating units each adapted to be supplied with lubricant independently of the casing and of the other units whereby after inserting the lubricating units in the casing the lubricant in each unit may be discharged as required independently of that discharged by the other units.

12. In a force feed oil and grease distributor, a removable cylinder having partitions forming a series of separate lubricating chambers or units, pistons movable endwise in said chambers, projections on said pistons the outer surfaces of which are a continuation of the outside surface of said cylinder adapted to cross sectionally close said openings and have endwise movement therein, an operating shaft passing through all of said chambers, bearings in said partitions for said operating shaft, threaded sleeves secured to said shaft in each of said chambers and having threaded connection with said pistons, and means on said shaft whereby said shaft and pistons are actuated.

W. LEE KLASERNER.